(12) United States Patent
Lu et al.

(10) Patent No.: US 10,203,457 B2
(45) Date of Patent: Feb. 12, 2019

(54) FIBER OPTIC CONNECTOR FERRULE WITH IMPROVED ALIGNMENT MECHANISM

(71) Applicant: CommScope Technologies LLC, Hickory, NC (US)

(72) Inventors: Yu Lu, Eden Prairie, MN (US); Michael Aaron Kadar-Kallen, Harrisburg, PA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 15/737,619

(22) PCT Filed: Jun. 14, 2016

(86) PCT No.: PCT/US2016/037382
§ 371 (c)(1),
(2) Date: Dec. 18, 2017

(87) PCT Pub. No.: WO2016/205201
PCT Pub. Date: Dec. 22, 2016

(65) Prior Publication Data
US 2018/0156986 A1    Jun. 7, 2018

Related U.S. Application Data

(60) Provisional application No. 62/182,195, filed on Jun. 19, 2015.

(51) Int. Cl.
*G02B 6/36* (2006.01)
*G02B 6/38* (2006.01)

(52) U.S. Cl.
CPC ......... *G02B 6/3882* (2013.01); *G02B 6/3885* (2013.01)

(58) Field of Classification Search
CPC ... G02B 6/3882; G02B 6/3883; G02B 6/3885
(Continued)

(56) References Cited

U.S. PATENT DOCUMENTS 5,408,558 A    4/1995  Fan
5,420,954 A    5/1995  Swirhun et al.
(Continued)

FOREIGN PATENT DOCUMENTS

CN    1451982 A    10/2003
JP    7-318761 A   12/1995
(Continued)

OTHER PUBLICATIONS

Ryton® PPS (PolyPhenylene Sulfide) Specifications, http://www.boedeker.com/ryton_p.htm, 2 pages (Copyright 2011).
(Continued)

*Primary Examiner* — Thomas A Hollweg
*Assistant Examiner* — Guy Anderson
(74) *Attorney, Agent, or Firm* — Merchant & Gould P.C.

(57) ABSTRACT

A fiber-optic connector ferrule body (10) that includes a depth that extends from a front end (12) to a rear end (14) of the ferrule. The ferrule includes a contact face (16) at the front end of the ferrule. The contact face includes a major dimension that extends along a major axis (X) defined by the contact face and a minor dimension that extends along a minor axis (Y) defined by the contact face. The major and minor axes are perpendicular to one another. The ferrule also defines alignment pin receivers (18) that extend rearwardly from the front end of the ferrule. The alignment pin receivers have tight-fit sections (26) that extend into the ferrule body from the contact face and flex sections (28) that extend from the first transverse cross-sectional shape to the rear end. The first and second transverse cross-sectional profiles define a degree of rotational flexibility between alignment pins (24)
(Continued)

received in the alignment pin receivers (18) and the ferrule body (10).

26 Claims, 13 Drawing Sheets

(58) Field of Classification Search
USPC .................................. 385/60, 64, 72, 78, 80
See application file for complete search history.

(56) References Cited

U.S. PATENT DOCUMENTS

| | | | |
|---|---|---|---|
| 5,596,662 A | | 1/1997 | Boscher |
| 5,611,010 A | | 3/1997 | Shiino et al. |
| 5,778,123 A | | 7/1998 | Hagan et al. |
| 5,845,028 A | | 12/1998 | Smith et al. |
| 5,920,670 A | | 7/1999 | Lee et al. |
| 5,923,803 A | * | 7/1999 | Bunin ................ G02B 6/3885 385/77 |
| 6,146,024 A | | 11/2000 | Melchior |
| 6,357,933 B1 | | 3/2002 | Bradley et al. |
| 6,425,692 B1 | | 7/2002 | Fujiwara et al. |
| 6,520,686 B1 | | 2/2003 | Kiani |
| 6,619,855 B2 | | 9/2003 | Dudoff et al. |
| 6,702,479 B2 | | 3/2004 | Yang |
| 6,755,574 B2 | | 6/2004 | Fujiwara et al. |
| 6,805,493 B2 | | 10/2004 | Igl et al. |
| 6,910,812 B2 | | 6/2005 | Pommer et al. |
| 7,296,935 B1 | | 11/2007 | Childers et al. |
| 8,585,300 B2 | | 11/2013 | Buijs et al. |
| 8,768,125 B2 | | 7/2014 | Beatty et al. |
| 9,274,287 B2 | * | 3/2016 | Takano ................ G02B 6/3871 |
| 9,417,406 B2 | | 8/2016 | Isenhour et al. |
| 9,470,852 B2 | * | 10/2016 | Takano ................ G02B 6/3871 |
| 9,829,646 B2 | | 11/2017 | Watte et al. |
| 2002/0050716 A1 | | 5/2002 | Cresswell |
| 2002/0114589 A1 | | 8/2002 | Igl et al. |
| 2002/0150347 A1 | | 10/2002 | Fujiwara et al. |
| 2002/0186932 A1 | | 12/2002 | Barnes et al. |
| 2003/0012516 A1 | | 1/2003 | Matsumoto et al. |
| 2003/0091297 A1 | | 5/2003 | Hung et al. |
| 2003/0098045 A1 | | 5/2003 | Loder et al. |
| 2003/0161584 A1 | * | 8/2003 | Ohtsuka ................ G02B 6/3882 385/60 |
| 2005/0286833 A1 | | 12/2005 | Kramer et al. |
| 2006/0013538 A1 | | 1/2006 | Hodge et al. |
| 2009/0052844 A1 | * | 2/2009 | Van Der Steen .... G02B 6/3869 385/60 |
| 2011/0262075 A1 | | 10/2011 | Beatty et al. |
| 2012/0014649 A1 | * | 1/2012 | Duis ................... G02B 6/3652 385/65 |
| 2012/0201499 A1 | | 8/2012 | Buijs et al. |
| 2012/0257860 A1 | | 10/2012 | Li et al. |
| 2012/0328244 A1 | * | 12/2012 | Sasaki ................ G02B 6/3865 385/59 |
| 2013/0170797 A1 | | 7/2013 | Ott |
| 2013/0266268 A1 | | 10/2013 | Li et al. |
| 2015/0168655 A1 | | 6/2015 | Isenhour et al. |
| 2015/0198773 A1 | | 7/2015 | Nakama et al. |
| 2016/0187591 A1 | | 6/2016 | Fortusini et al. |
| 2016/0252682 A1 | | 9/2016 | Watte et al. |
| 2017/0307828 A1 | | 10/2017 | Elenbaas |
| 2017/0343741 A1 | | 11/2017 | Coenegracht et al. |
| 2017/0363816 A1 | | 12/2017 | Elenbaas |

FOREIGN PATENT DOCUMENTS

| | | |
|---|---|---|
| JP | 2014-77919 A | 5/2014 |
| WO | 02/088810 A1 | 11/2002 |

OTHER PUBLICATIONS

Satake, T. et al., "MPO-type single-mode multi-fiber connector: Low-loss and high-return-loss intermateability of APC-MPO connectors," Optical Fiber Technology, vol. 17, pp. 17-30 (2011).
International Search Report and Written Opinion of the International Searching Authority for corresponding International Patent Application No. PCT/US2016/037382 dated Sep. 21, 2016, 9 pages.

* cited by examiner

FIBER OPTIC CONNECTOR FERRULE WITH IMPROVED ALIGNMENT MECHANISM

CROSS-REFERENCE TO RELATED APPLICATION

This application is a National Stage Application of PCT/US2016/037382, filed on Jun. 14, 2016, which claims the benefit of U.S. Patent Application Ser. No. 62/182,195, filed on Jun. 19, 2015, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connector ferrules used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. The fibers in a multi-fiber ferrule must all be brought into contact. Preferably, the tips of the fibers should all lie in a line (for a single row of fibers) or plane (multiple rows of fibers).

Polishing results in a nearly planar surface; however this surface is not consistently oriented with respect to the axis defined by the guide pins. For example, the fiber slope angle, which is nominally zero, is not well controlled. It is difficult to measure this angle accurately, since it involves features that extend in three dimensions: the axes of the alignment pin passageways extend along a longitudinal axis, and the contact face of the ferrule extends along major (or lateral) and minor (or vertical) axes. The pins are held very rigidly by the ferrules, such that the ferrules cannot rotate about the minor axis to allow the ends of the fibers to come into contact when the ferrules are urged forward by a spring force.

Alignment connection systems have been developed to improve the loss of physical contact between fiber-optic connectors. However, there is a need to reduce the rotational stiffness of the ferrule and guide pin mechanical system such that physical contact can be made between all fibers in a multi-fiber connector.

SUMMARY

One aspect of the present disclosure relates to rotational interplay between an alignment pin and different sections of an alignment pin passageway extending through a multi-fiber ferrule body. The alignment pin can have a transverse cross-sectional profile that engages a tight-fit section of the alignment pin passageway, thus limiting rotational movement of the ferrule body about a major axis and a minor axis. The ferrule body also has a loose-fit flex section that engages the alignment pin along the minor axis to limit rotational movement about the major axis. Along the major axis, the flex section has a width that provides a clearance from the alignment pin to allow for rotational movement about the minor axis. This freedom for rotational movement about the minor axis aids in maintaining optical contact between the multi-fiber ferrule body and a corresponding similar multi-fiber ferrule body.

Another aspect of the present disclosure relates to a fiber optic connector ferrule that includes a ferrule body with a depth along a longitudinal axis that extends from a front end to a rear end of the ferrule. The ferrule includes a contact face at the front end of the ferrule. The contact face includes a major dimension that extends along a major axis and a minor dimension that extends along a minor axis. The major and minor axes are perpendicular to one another and perpendicular to the longitudinal axis. The ferrule also defines alignment pin receivers that extend rearwardly from the front end of the ferrule. The alignment pin receivers define a tight-fit section that is defined by a first transverse cross-sectional profile extending into the ferrule body from the contact face and a loose-fit flex section defined by a second transverse cross-sectional profile extending from the first transverse cross-sectional profile to the rear end. The second transverse cross-sectional profile comprises a different clearance than the first transverse cross-sectional profile. The fiber optic connector ferrule also has plurality of optical fibers that extend through the ferrule body. The optical fibers have end faces that are accessible at the contact face of the ferrule. The fiber optic ferrule also has a pair of alignment pins with proximal ends positioned within the alignment pin receivers and distal ends protruding outwardly away from the contact face. The proximal end portions have a third transverse cross-sectional profile that is different than the alignment pin opening second transverse cross-sectional profiles. The different third and second transverse cross-sectional profiles are relatively configured to provide rotational flexibility between the alignment pins and the ferrule body. The different dimensions of the first and second transverse cross-sectional profiles define the degree of rotational flexibility between the alignment pins and the ferrule body.

A still further aspect of the present disclosure relates to a fiber optic connector ferrule that has a ferrule body with a depth along a longitudinal axis that extends from a front end to a rear end of the ferrule. The ferrule includes a contact face at the front end of the ferrule. The contact face includes a major dimension that extends along a major axis and a minor dimension that extends along a minor axis. The major and minor axes are perpendicular to one another and perpendicular to the longitudinal axis. The ferrule also defines alignment pin receivers that extend along the longitudinal axis rearwardly from the front end of the ferrule body toward the rear end of the ferrule body. The fiber optic connector also includes a plurality of optical fibers that extend along the longitudinal axis through the ferrule body generally from the front end to the rear end of the ferrule body. The optical fibers have end faces that are accessible at the contact face of the ferrule. The fiber optic connector also includes a pair of alignment pins that have proximal ends positioned within the alignment pin receivers and distal ends protruding outwardly away from the contact face. The alignment pin receivers and the alignment pins are configured such that a tight fit region is defined between the proximal ends of the alignment pins and the alignment pin receivers immediately adjacent to the contact face. The alignment pin receivers and the alignment pins also are configured such that a looser fit region is defined between the proximal ends of the alignment pins and the alignment pin receivers immediately rearward of the tight fit region.

DESCRIPTION

Figure 1:
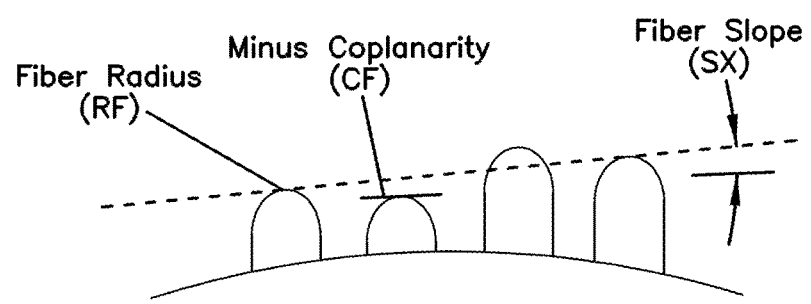
FIG. 1 shows example multi-fiber ferrule contact face geometry parameters for physical contact, showing fiber slope (SX), minus coplanarity (CF) and fiber tip radius (RF).

To ensure a low loss, reliable connection between two multi-fiber ferrules, physical contact of all mating ferrules is critical. As fibers are protruding above the ferrule contact face, the physical contact is achieved under a spring force and is affected by the contact-face geometry. As illustrated in FIG. 1, a multi-fiber optical contact interface defines three parameters, fiber slope (SX), minus coplanarity (CF) and fiber tip radius (RF). Fiber radius (RF) is defined by the sharpness (radius/diameter) of the tip end of a fiber, such that a sharper (smaller radius/diameter) tip creates easier deformation. Minus coplanarity (CF) defines how far away the fiber tip is from the contact line. Fiber slope (SX) defines the angle of the fiber tips to a reference plane that is perpendicular to a fiber guide pin hole axis. Fiber slope (SX) has the largest impact on physical contact due to the amount of variation in current manufacturing. To maintain optical contact, the fiber slope (SX) value is preferably less than 0.06°.

Figure 2A:
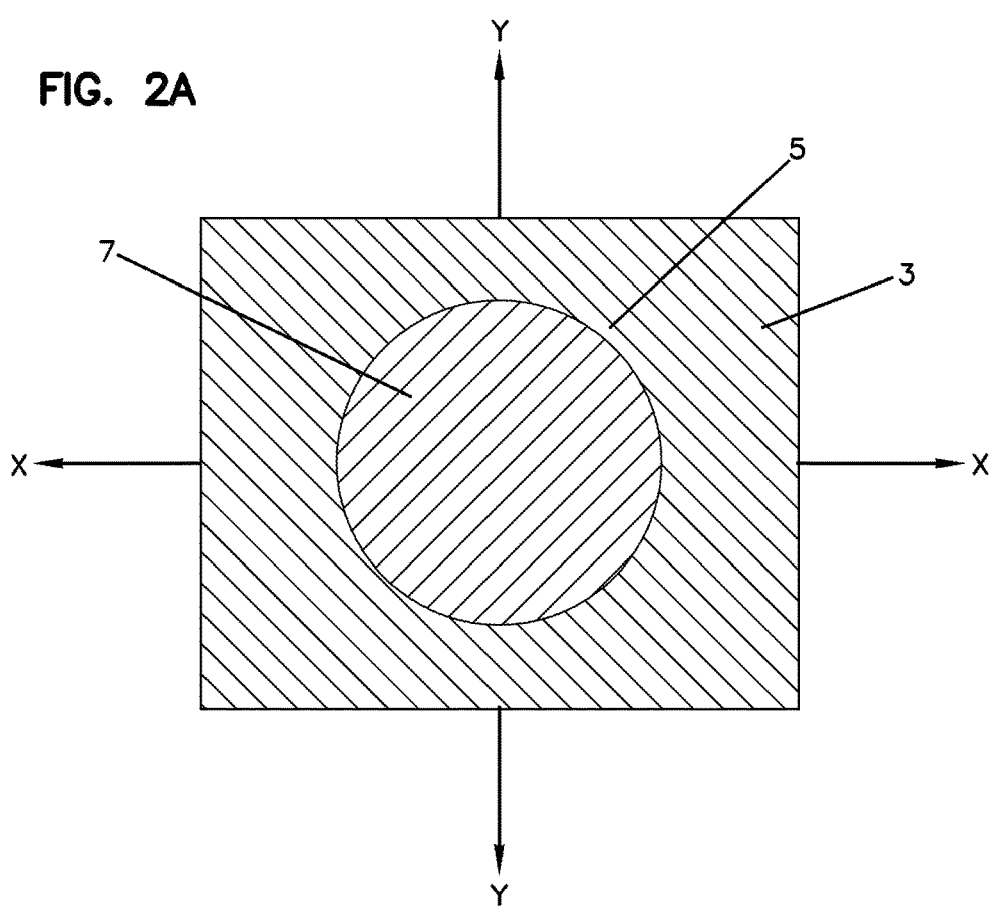
FIGS. 2A-2B show cross-sectional views of interplay between an alignment pin and tight-fit and flex sections of an alignment pin passageway extending through a multi-fiber ferrule body.
Figure 2B:
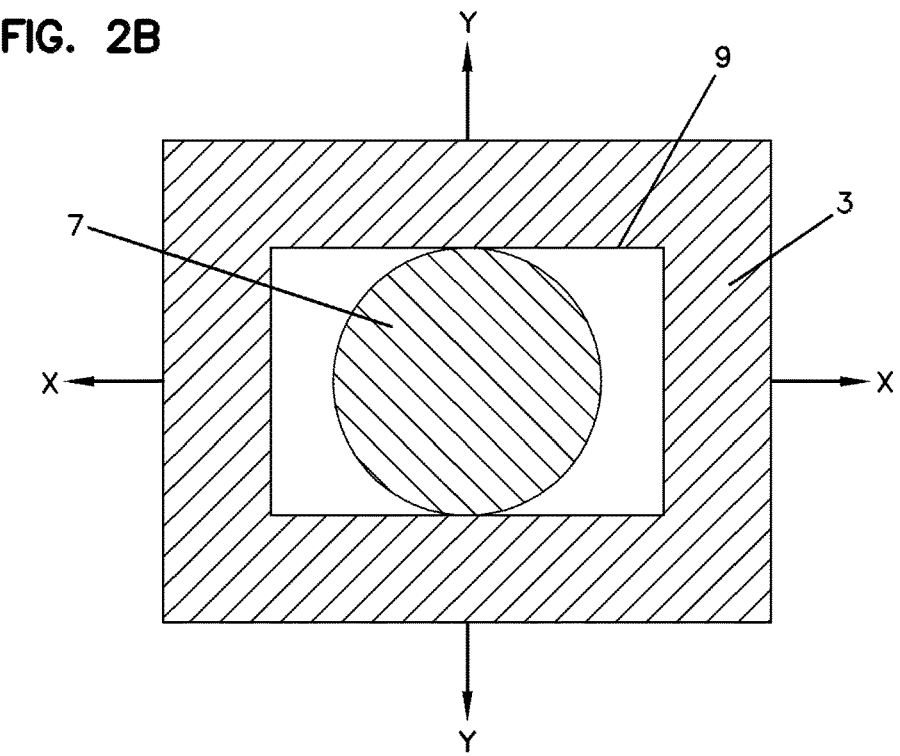
Figure 4:
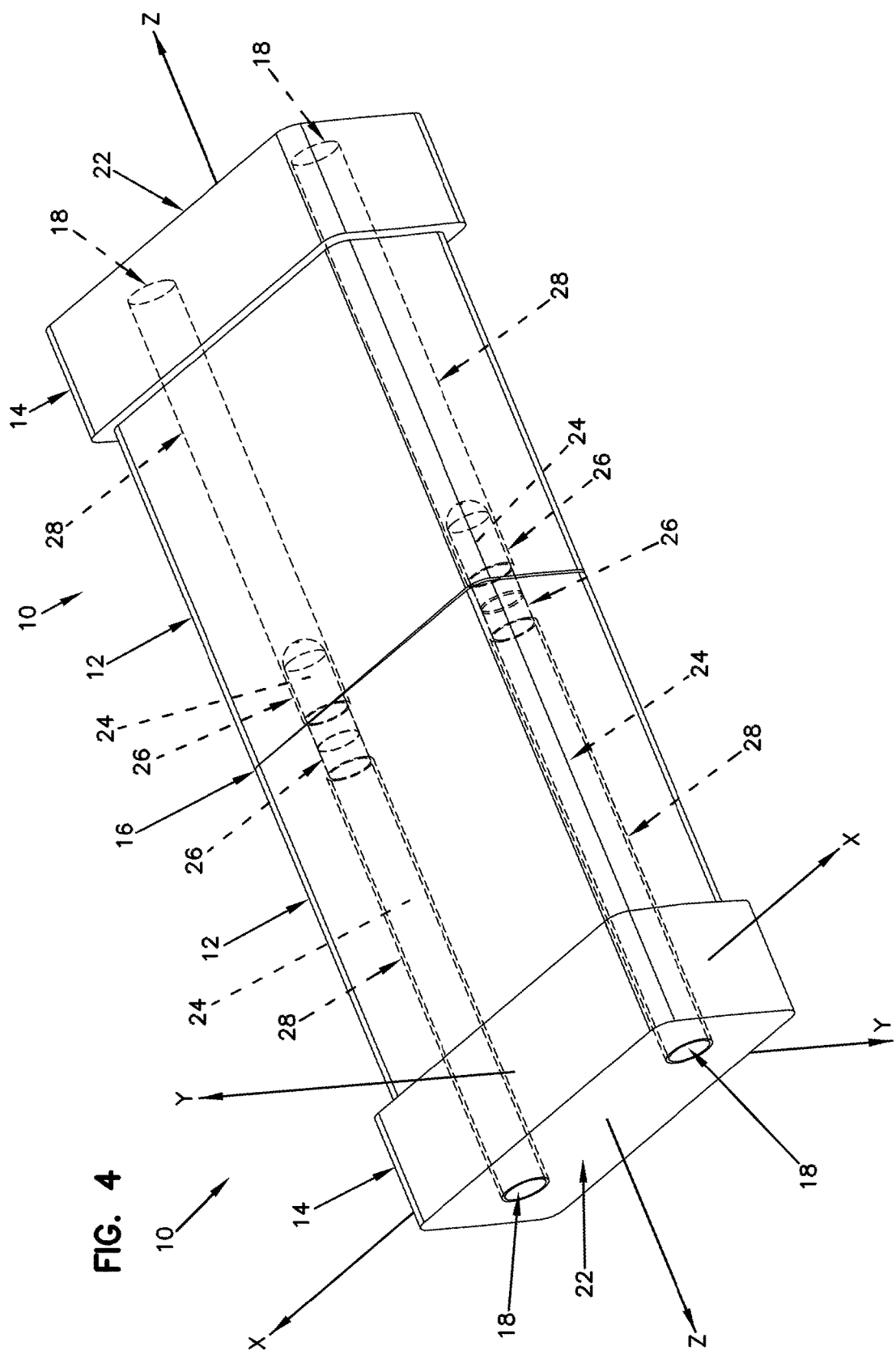
FIG. 4 shows a top perspective see-through view of the multi-fiber ferrule shown in FIG. 3, shown with alignment pins to maintain contact-face optical connection with a second multi-fiber ferrule.
Figure 5:
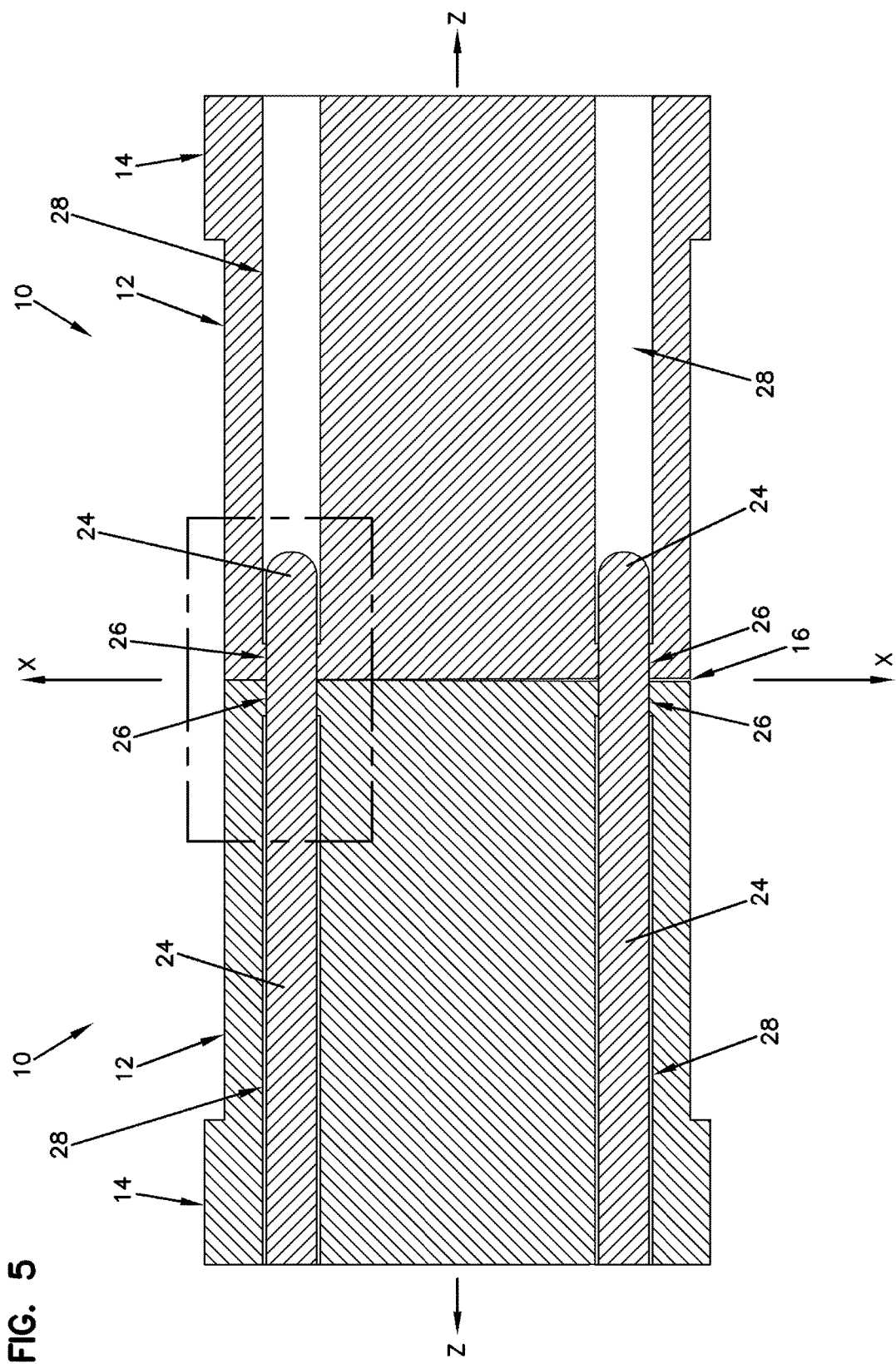
FIG. 5 shows a top cross-sectional view of the optically-connected multi-fiber ferrules shown in FIG. 4.
Figure 6:
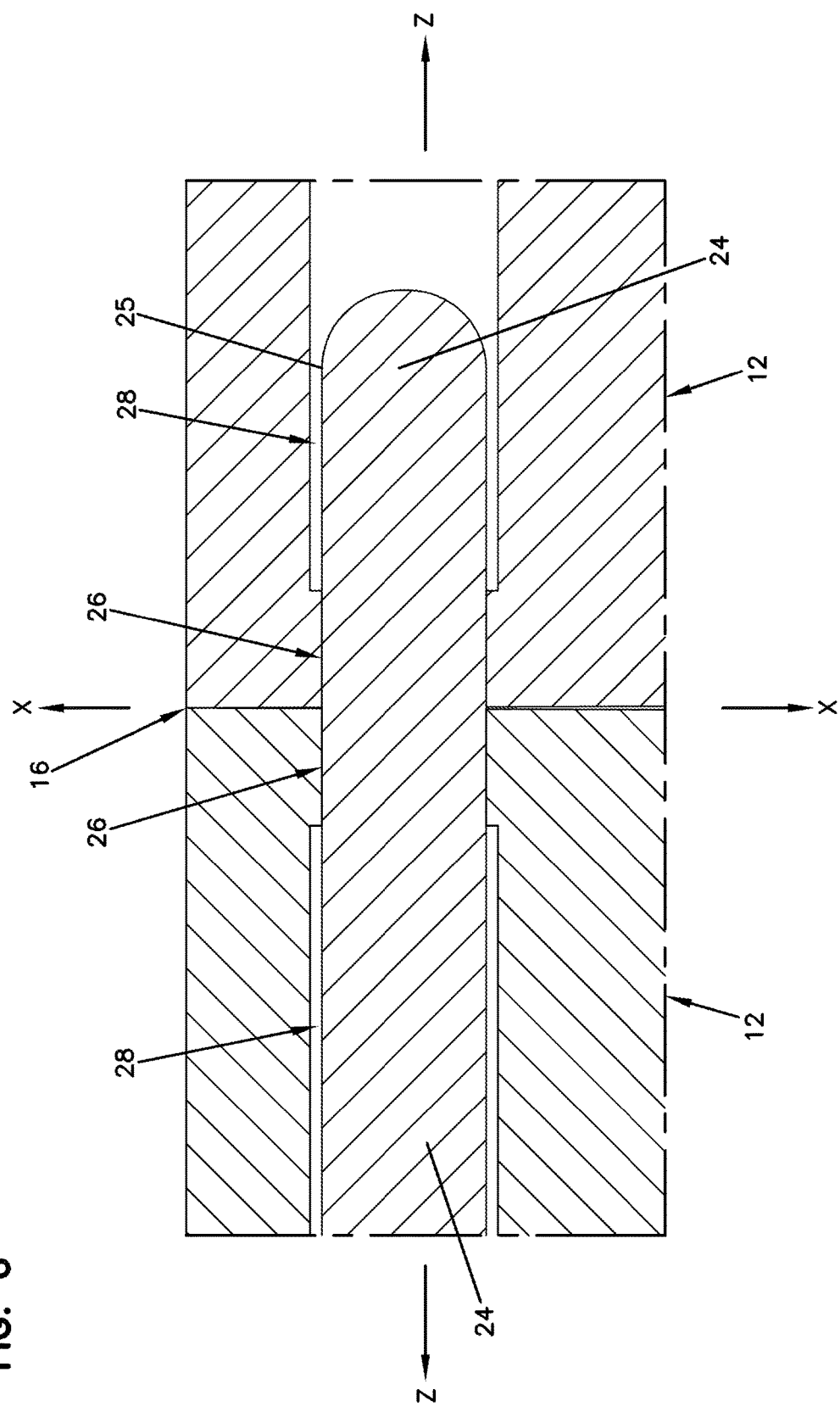
FIG. 6 shows an enlarged cross sectional view of an alignment pin extending across the optically-connected multi-fiber ferrules shown in FIG. 5.
Figure 7:
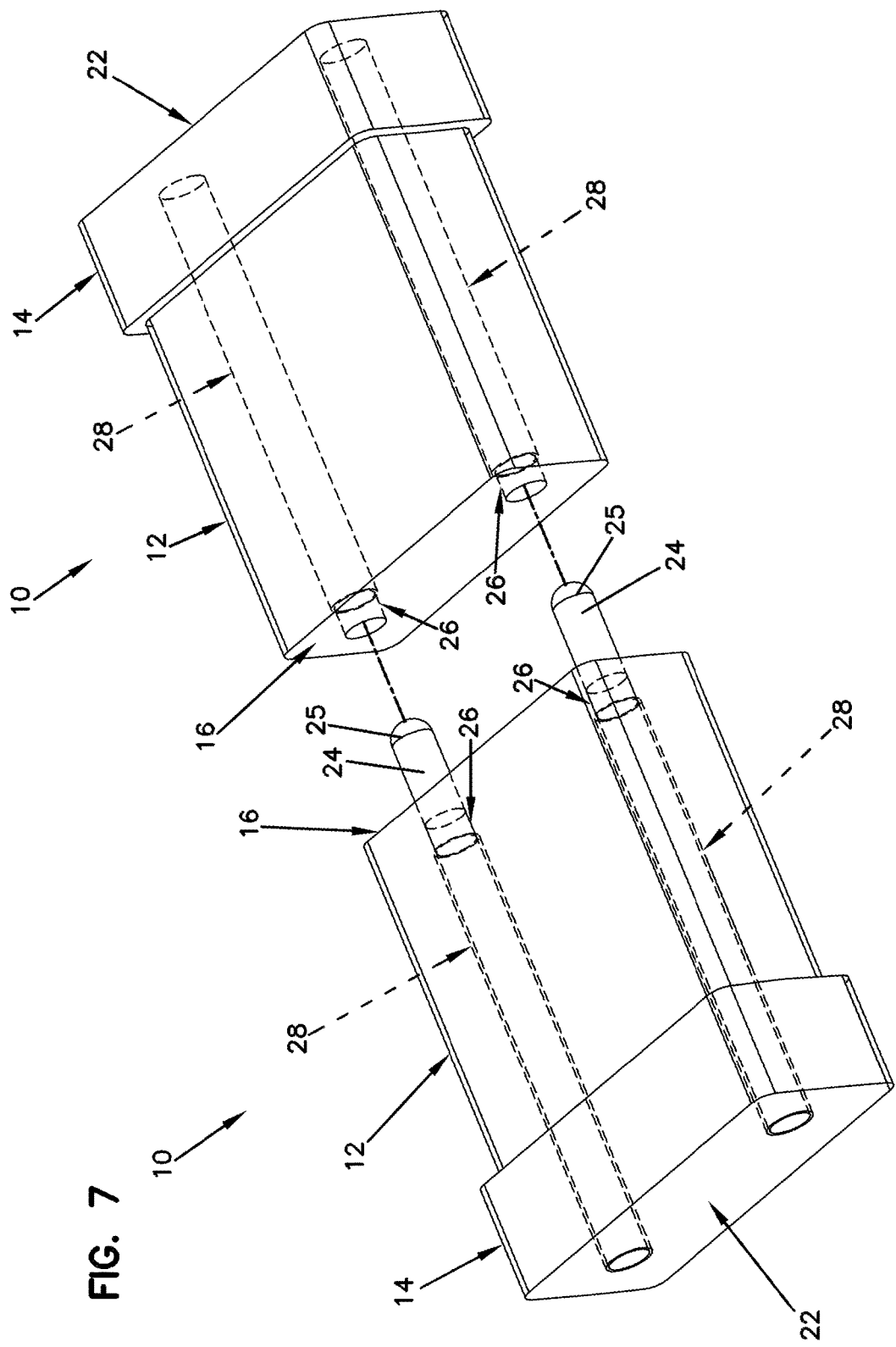
FIG. 7 shows a top perspective see-through view of the multi-fiber ferrules shown in FIG. 4, shown separated from contact face optical connection.
Figure 8:
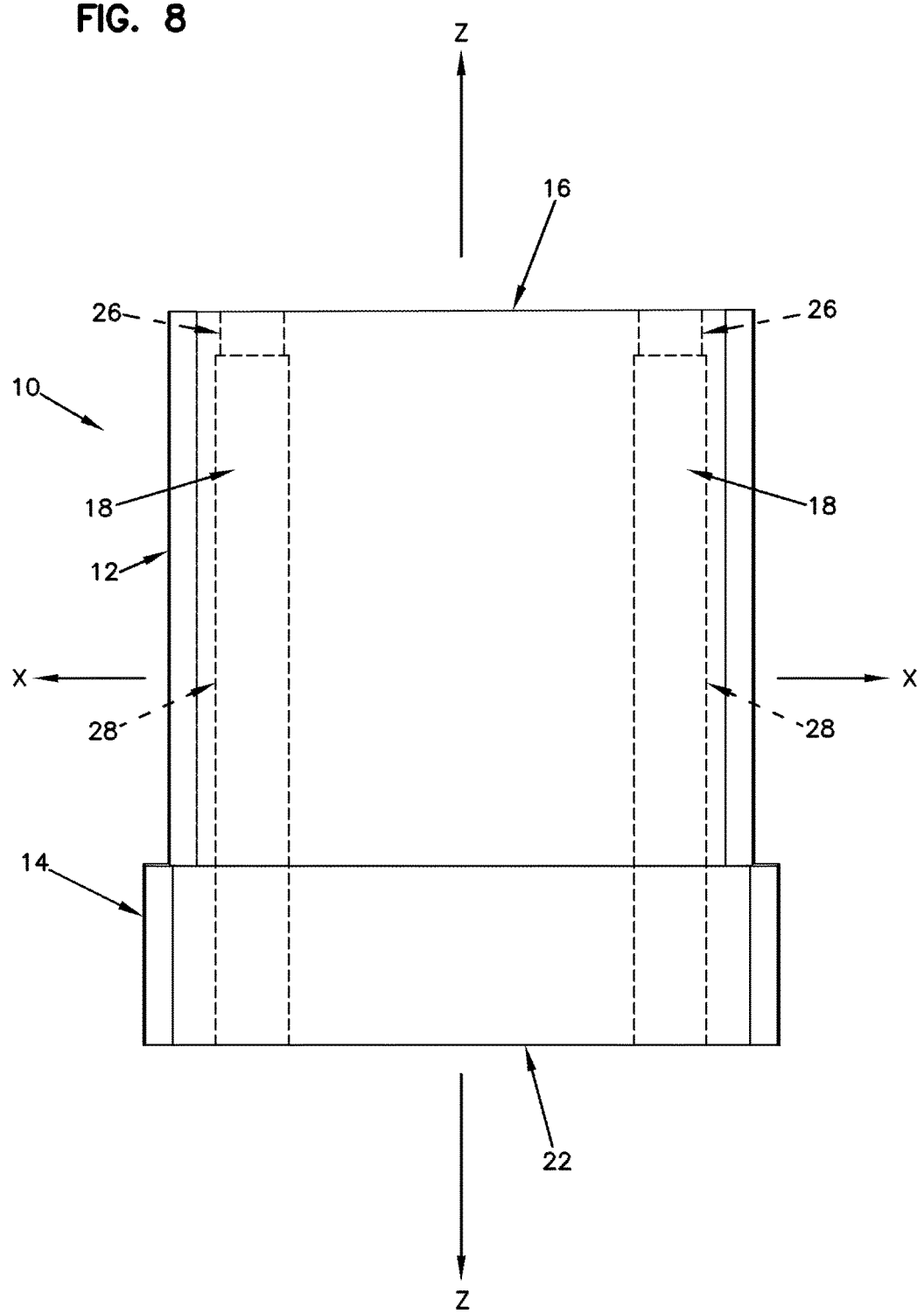
FIG. 8 shows a top see-through view of the multi-fiber ferrule shown in FIG. 4, shown without alignment pins.

FIGS. 2A-2B illustrate cross-sectional views of interplay between an alignment pin 7 within different sections of an alignment pin passageway extending through a multi-fiber ferrule body 3, according to an example embodiment. As illustrated in FIG. 2A, the alignment pin 7 has a transverse cross-sectional profile that engages a tight-fit section 5 that has a transverse cross-sectional profile, thus limiting rotational movement of the ferrule body 3 about a major axis X and a minor axis Y. As illustrated in FIG. 2B, the ferrule body 3 also has a loose-fit flex section 9 with a transverse cross-sectional profile that has a height along the minor axis Y that engages the alignment pin 7 to limit rotational movement about the major axis X. Along the major axis X, the flex section 9 has a width that provides a clearance from the alignment pin 7 to allow for rotational movement about the minor axis Y.

Figure 3:
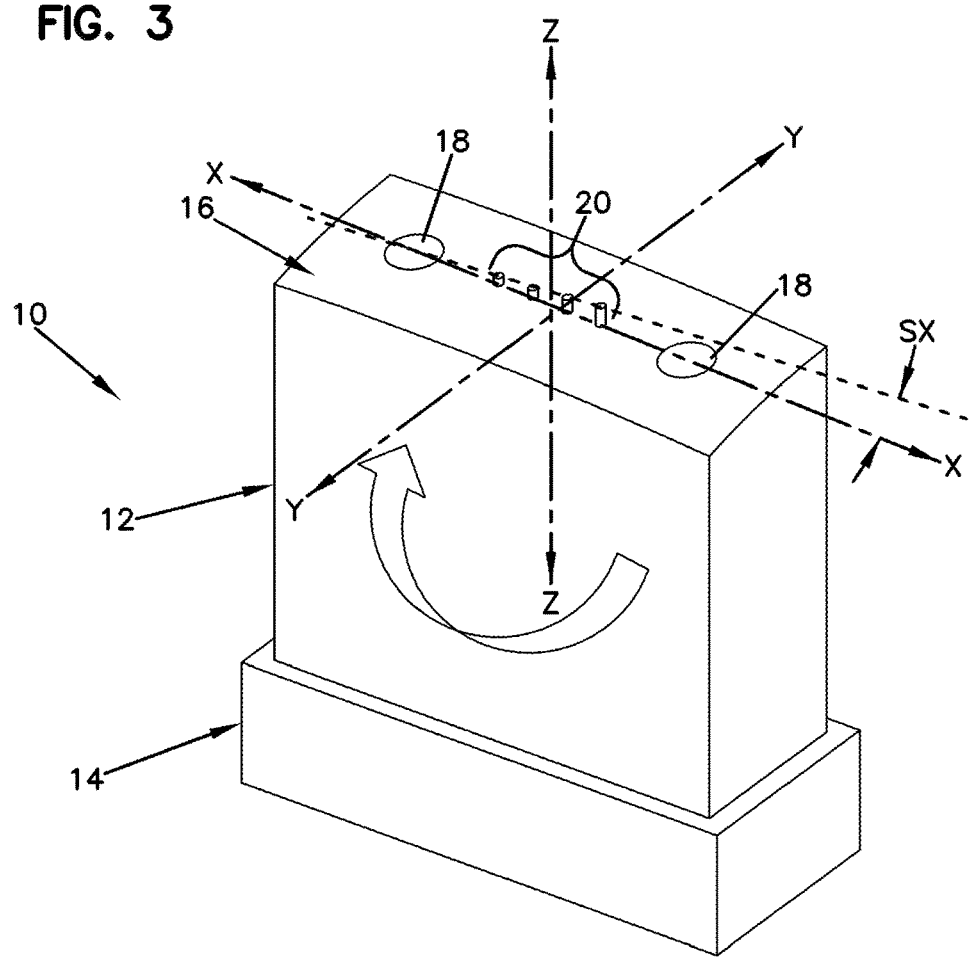
FIG. 3 shows a contact-face-end perspective view of a multi-fiber ferrule according to an example embodiment of the present disclosure, showing a freedom to slightly rotate about the Y-axis, so that fiber slope angle is compensated.

FIG. 3 illustrates an example multi-fiber ferrule that includes a body 10 with a front end 12 and a rear end 14. A contact face 16 is positioned along the front end 12 opposite the rear end 14. A support face 22 is positioned along the rear end 14 opposite the front end 12. The ferrule body 10 has a major axis X and a minor axis Y extending perpendicularly with respect to each other relative to the contact face 16. A longitudinal axis Z extends through the ferrule body 10 from the front end 12 to the rear end 14. A pair of alignment pin passageways 18 extends, in parallel with the longitudinal axis Z, from the contact face 16. The alignment pin passageways 18 are positioned along the major axis X on either side of a plurality of optical fibers 20. The optical fibers 20 protrude outwardly away from the contact face 16 and extend through the ferrule body 10 from the contact face to the rear end 14 parallel to the longitudinal axis Z.

FIGS. 4-7 illustrate a pair of the example ferrule bodies 10 (FIG. 2) in physical contact with each other. Each ferrule body 10 optically contacts the other with their respective contact faces 16. The optical fibers 20 of each ferrule body 10 contact the other. Each depicted alignment pin passageway 18 provides a continuous passageway with a tight-fit section 26 defined by a first transverse cross-sectional profile extending into the ferrule body 10 from the contact face 16 and a flex section 28 defined by a second transverse cross-sectional profile extending from the first transverse cross-sectional shape to the support face 22 along the rear end 14. As illustrated, the flex section 28 second transverse cross-sectional profiles can provide a clearance, for example a greater width along the major axis X, and/or a greater height along the minor axis Y, from the tight-fit section 26 first transverse cross-sectional profiles.

As illustrated particularly in FIGS. 4-7, in operation the ferrule 10 can receive a pair of alignment pins 24 within the alignment pin passageways 18. The illustrated alignment pins 24 can have proximal base end portions that are received in the alignment pin receivers 18 and distal tips that protrude outwardly away from the contact face 16. The proximal base end portions of the alignment pins 24 have a third transverse cross-sectional profile that is nearly identical to the first transverse cross-sectional profile of the tight-fit section 26. Preferably, the first transverse cross-sectional profile of the tight-fit section 26 is defined by the third transverse cross-sectional profile of the alignment pins 24 in order to maintain a tight fit between the alignment pins within the tight-fit sections. For example, the first transverse cross-sectional profile and the third transverse cross-sectional profile can both be oval, rectangular, octagonal, rectangular, or any predetermined shape that matches and maintains a tight fit.

By contrast, the third transverse cross-sectional profile of the alignment pins 24 is different than the second transverse cross-sectional profile of the flex section 28 of the alignment pin receivers 18. Preferably the difference between the second and third transverse cross-sectional profiles is defined by a degree of rotational freedom about the minor axis Y of the ferrule body 10 with respect to the alignment pin 18, illustrated by the curved arrow in FIG. 3. The degree of rotational freedom increases with an increased dimensional difference between the second and third transverse cross-sectional profiles, and vice versa. During such rotation, one alignment pin 24 inserts into a corresponding alignment pin receiver 18 of an opposing ferrule body 10 a deeper distance than the other. For example, the second transverse cross-sectional profile can have a greater dimension along the major axis X than the third transverse cross-sectional profile to provide flexibility along the major axis. Alternatively, the second transverse cross-sectional profile can have a greater dimension along the minor axis Y than the third transverse cross-sectional profile to provide flexibility along the minor axis. Alternatively still, the second transverse cross-sectional profile can have greater dimensions along the major axis X and the minor axis Y than the third transverse cross-sectional profile to provide flexibility along both axes. The tight-fit section 26 can maintain its transverse cross-sectional profile throughout its entire length. The flex section 28 can maintain its transverse cross-sectional profile throughout its entire length, or it can taper.

As illustrated in FIGS. 4-8, the tight-fit section 26 first transverse cross-sectional profiles can be circular with a first diameter. As illustrated particularly in FIGS. 4 and 7, the second transverse cross-sectional profiles can be circular with a second diameter that is greater than the first diameter. The third transverse cross-sectional profiles can have a third diameter that allows for a tight engaging fit within the first diameter of the tight-fit section 26. This allows the outwardly extending distal tips of the alignment pins 24 to tightly fit within the tight-fit section 26 of an optically connecting ferrule 10, as depicted. The different third and second transverse cross-sectional profiles are relatively configured so that the ferrule body 10 provides less resistance to the alignment pins 24 when they pivot or flex along the major axis X. For example, a gap can exist between the third diameter of the alignment pins 24 and the second diameter of the flex section 28 to allow the proximal base end of the alignment pins to pivot within the flex section. As particularly shown in FIGS. 1 and 3, the extent to which the contact faces 16 can pivot with respect to each other and still maintain an optical connection is defined by a plane that extends across the plurality of optical fibers 20.

Alternatively, the tight-fit section 26 first cross-sectional profiles and the flex section 28 second cross-sectional profiles can define shapes other than circles, for example ovals, rectangles, squares, octagons, or any alternative shape that allows for a tight fit of the alignment pins 24 in the tight-fit section and a pivot or flex along the major axis X of the flex section.

The length of the tight-fit sections 26 of the alignment pin passageways 18 along the longitudinal axis Z can also define the rotational flexibility of the alignment pins 24 with respect to the ferrule body 10. The degree of rotational freedom decreases with an increase in the length of the tight-fit sections 26, and vice versa. For example, a longer tight-fit section 26 reduces the rotational flexibility of the alignment pins 24 with respect to the ferrule body 10, whereas a shorter tight-fit section increases the rotational flexibility. Preferably, the tight-fit sections 26 of the alignment pin passageways 18 can have a length along the longitudinal axis Z equivalent to a maximum of twice the diameter of the alignment pins 24. The alignment pins 24 can have a diameter of about 0.7 mm. Alternatively, the tight-fit sections 26 of the alignment pin passageways 18 can extend a length along the longitudinal axis Z a maximum of 1.95 mm from the contact face 16, and preferably less than 1.95 mm from the contact face, and most preferably about 1.4 mm. The distance between the contact face 16 and the transition location 25 of the proximal base end third transverse cross-sectional profile to the distal tip section can be between about 0.2 mm and about 3.1 mm, more preferably between about 0.2 mm and about 1.6 mm.

The ferrule body 10 can be composed of material that provides a defined degree of elasticity and compression, for example PPS glass-filed material. The elasticity preferably has a Young's modulus of between about 14,000 MPa and 25,000 MPa, more preferably between 14,300 MPa and 20,000 MPa, and most preferably about 15,000 MPa. The material preferably has a Poisson's ratio of 0.35.

The alignment pins 24 can have a stiffness that allows for bending during misalignment of the pins and the alignment pin passageways 18. For example, the alignment pins 24 can have an elasticity with a Young's modulus of about 207,000 MPa and a Poisson's ratio of about 0.25. The coefficient of friction between the alignment pins 24 and the alignment pin passageways 18 can be 0.2, defined by the alignment pin/alignment pin passageway.

Figure 9:
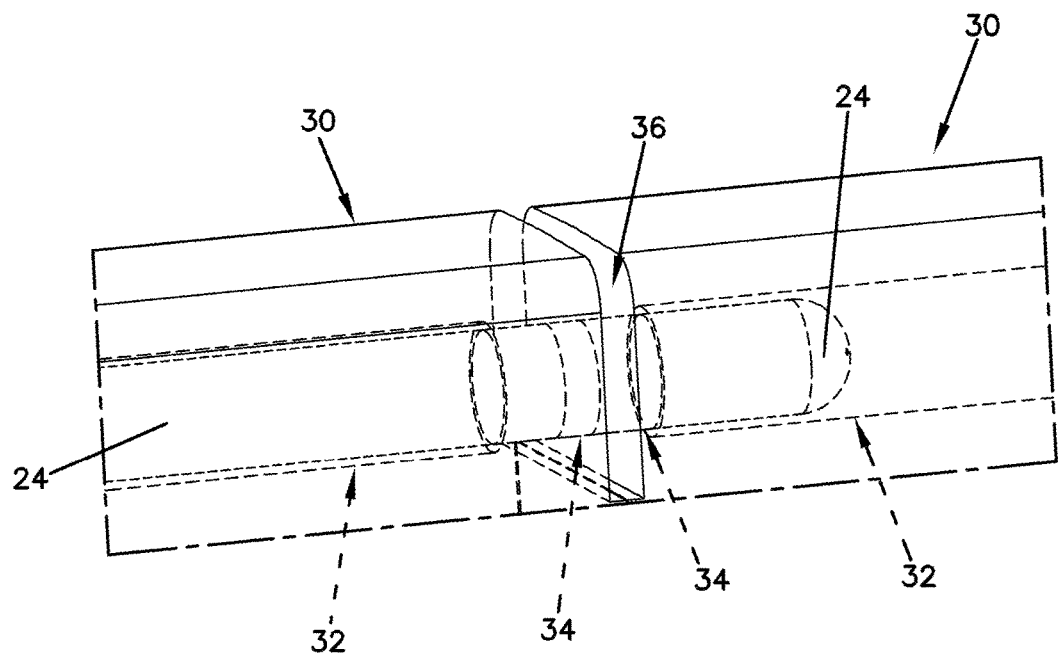
FIG. 9 shows an enlarged perspective see-through view of multi-fiber ferrules aligned with an alignment pin according to a second example embodiment of the present disclosure.
Figure 10:
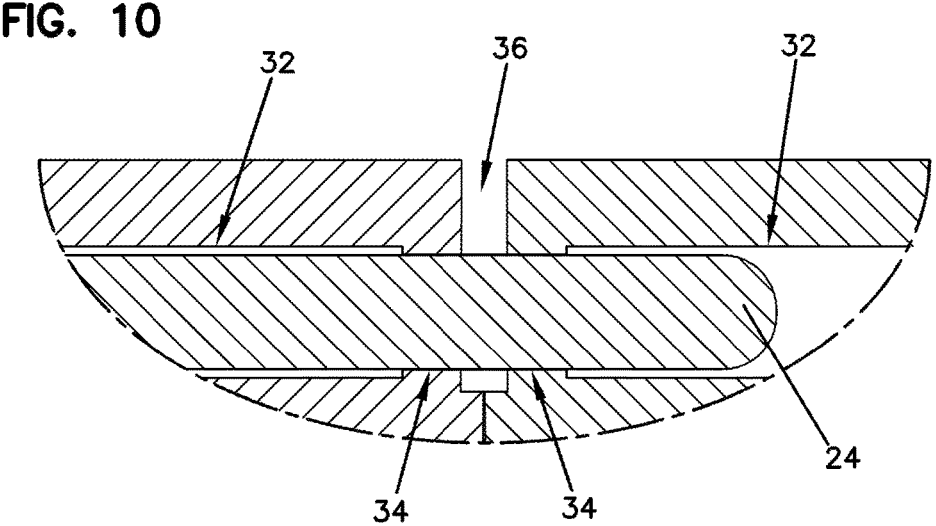
FIG. 10 shows a cross-sectional view of the multi-fiber ferrules shown in FIG. 9.

As illustrated particularly in FIGS. 9-10, an alternative ferrule body 30 can include tight-fit sections 34 and flex sections 32 similar to the ferrule described above. The alternative ferrule body 30 can also include a pair of notches 36 cut-out and recessed around each alignment pin passageway, and be defined by the major X and minor Y axes. These recessed notches 36 can provide even greater lateral freedom of the alignment pins 24 with respect to the ferrule body 30.

Figure 11:
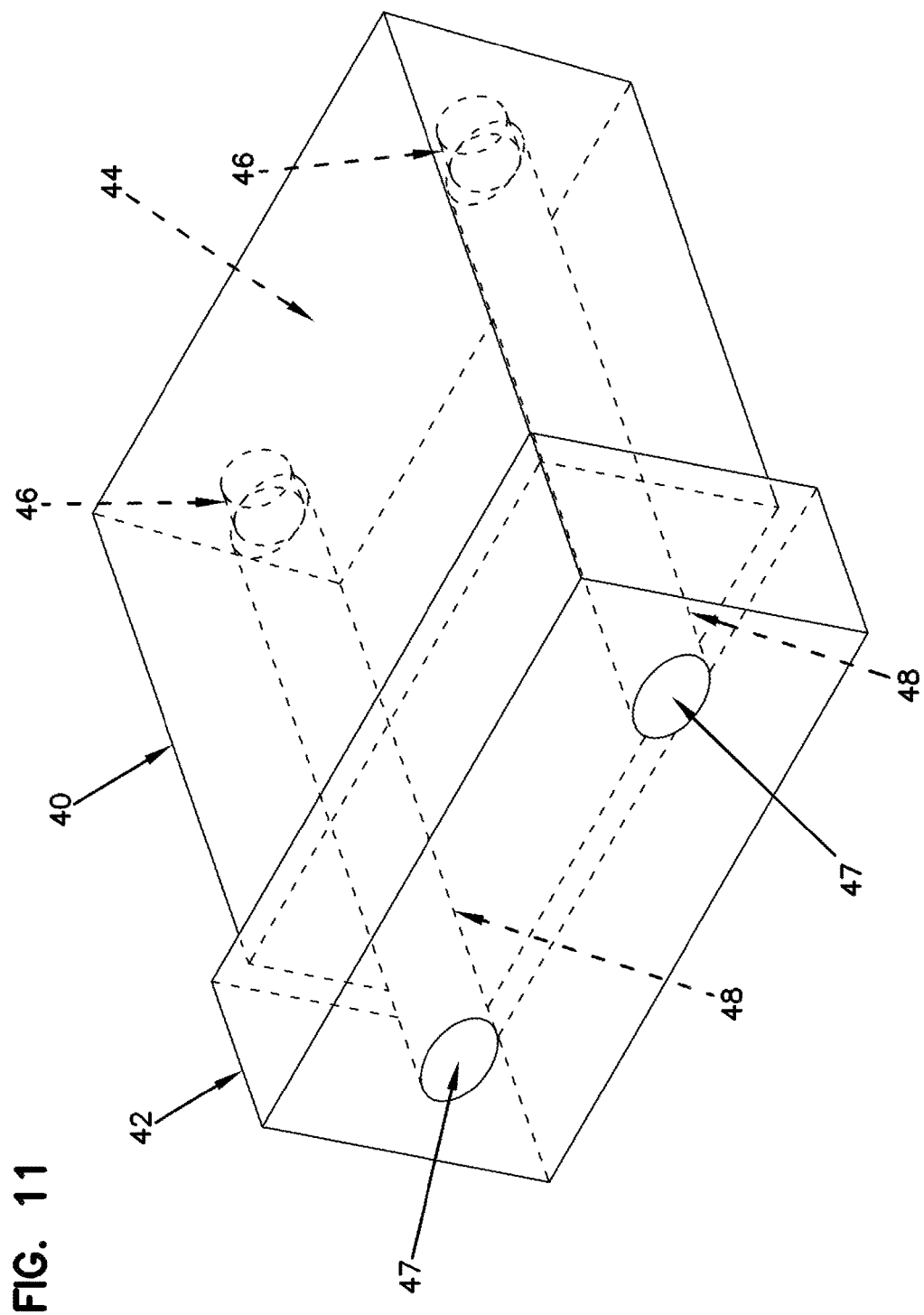
FIG. 11 shows a perspective rear-end see-through view of a multi-fiber ferrule according to a third example embodiment of the present disclosure.

As illustrated particularly in FIG. 11, an alternative ferrule body can include a front end 40, rear end 42, contact face 44 and alignment pin passageways 47 with tight-fit sections 46 similarly to the ferrules described above. The alternative ferrule body can also have a flex section 48 defined by oval second transverse cross-sectional shapes that provide a height along the minor axis Y common with the tight-fit sections 46 and a greater width along the major axis X than the tight-fit sections. The flex sections 48 can maintain the oval shape throughout their length.

Figure 12:
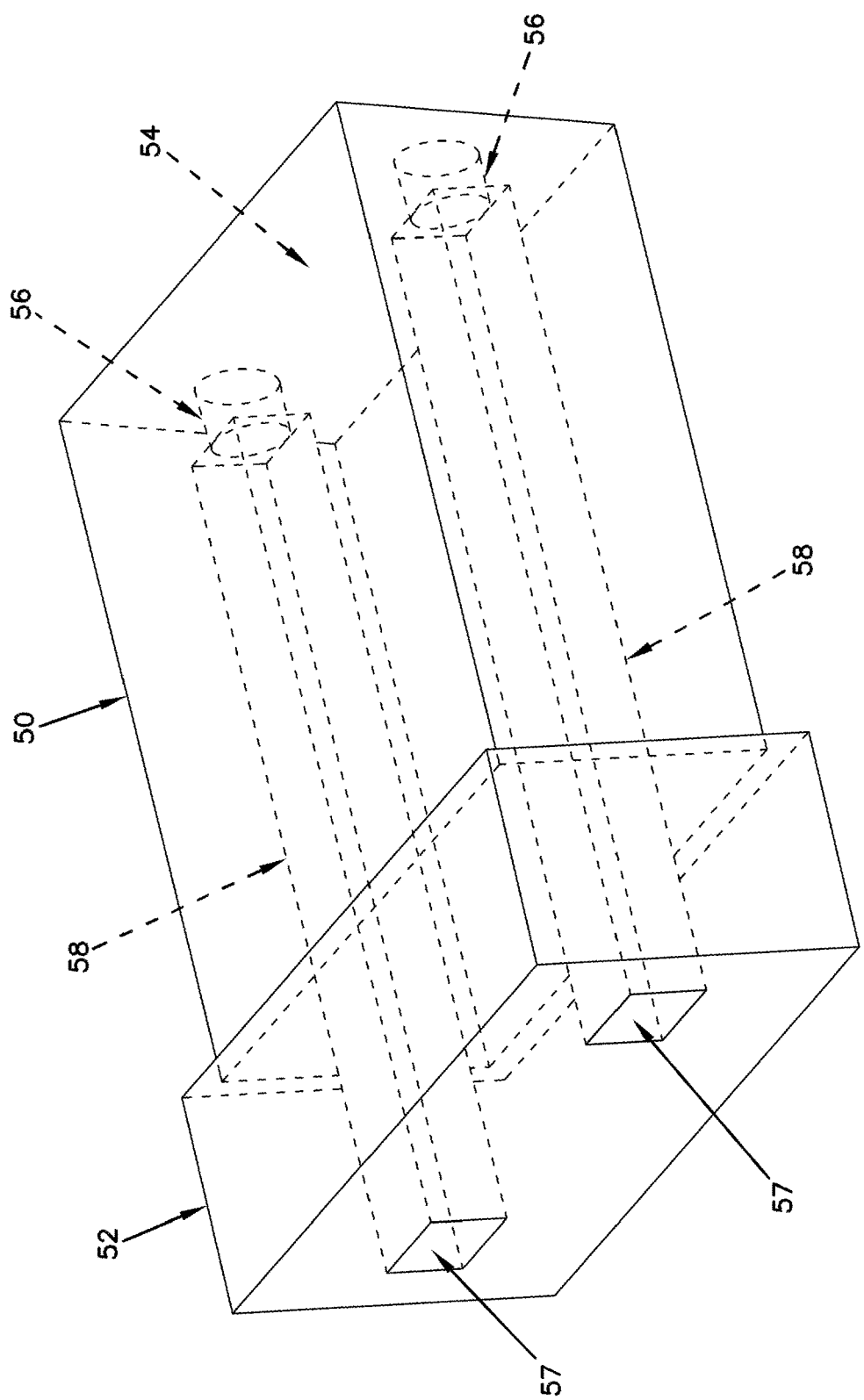
FIG. 12 shows a perspective rear-end see-through view of a multi-fiber ferrule according to a fourth example embodiment of the present disclosure.

As illustrated particularly in FIG. 12, an alternative ferrule body can include a front end 50, rear end 52, contact face 54 and alignment pin passageways 57 with tight-fit sections 56 similarly to the ferrules described above. The alternative ferrule body can also have a flex section 58 defined by rectangular second transverse cross-sectional profiles that provide a height along the minor axis Y common with the tight-fit sections 56 and a clearance defined by a greater width along the major axis X than the tight-fit sections. The flex sections 58 can maintain the rectangular shape throughout their length.

Figure 13:
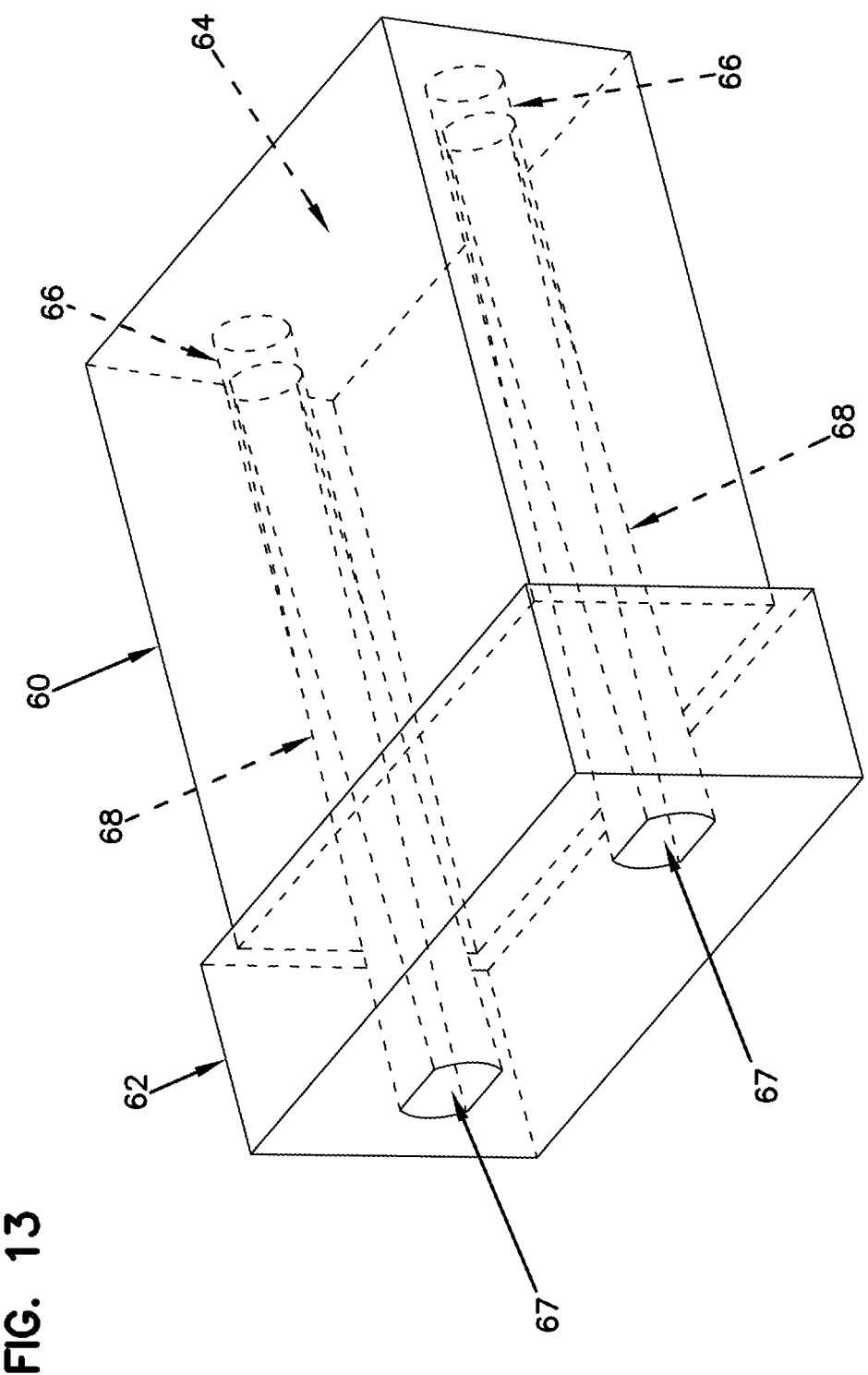
FIG. 13 shows a perspective rear-end see-through view of a multi-fiber ferrule according to a fifth example embodiment of the present disclosure.
Figure 14:
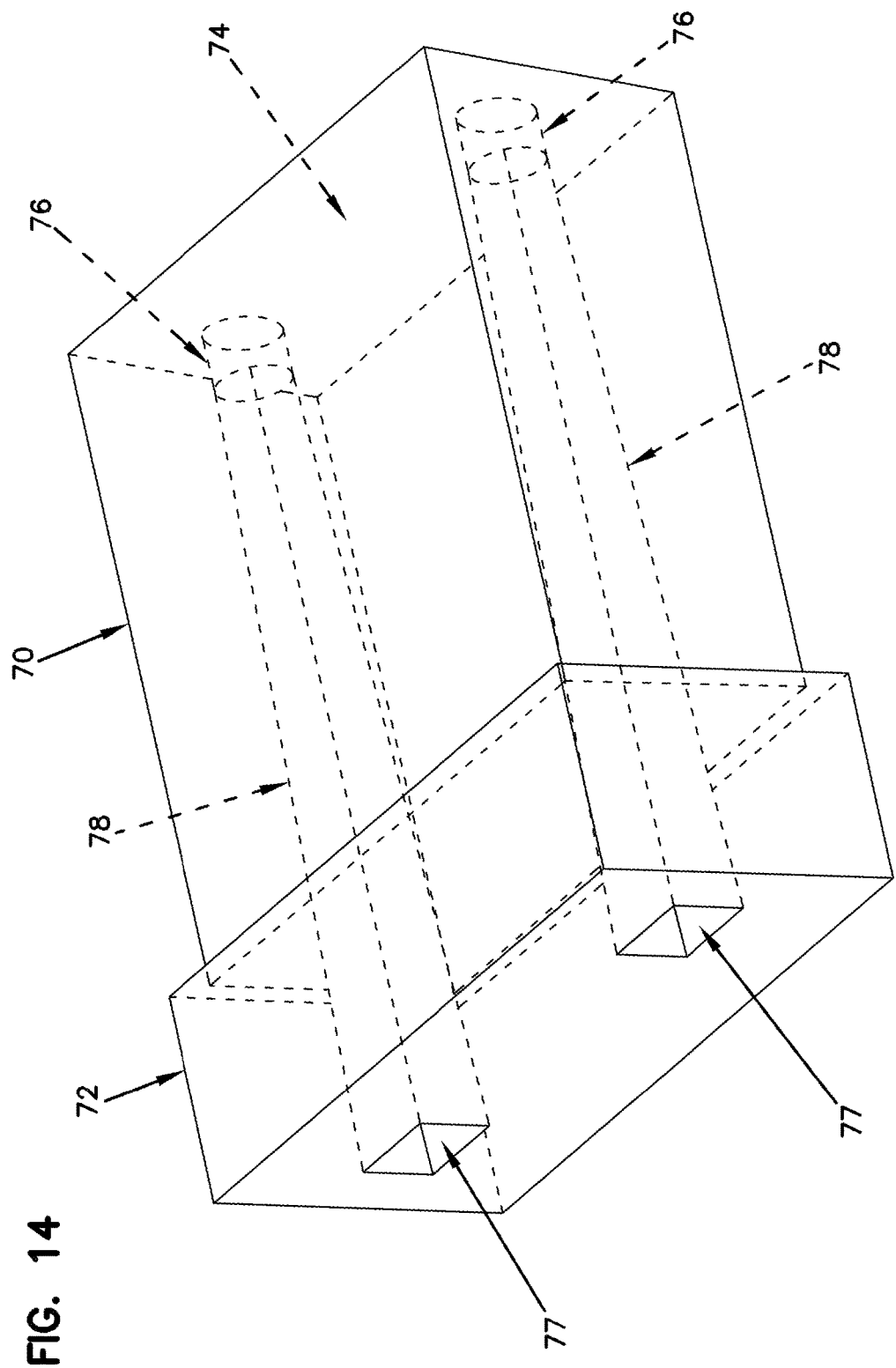
FIG. 14 shows a perspective rear-end see-through view of a multi-fiber ferrule according to a sixth example embodiment of the present disclosure.

As illustrated particularly in FIGS. 13-14, alternative ferrule bodies can include a front end 60, 70, rear end 62, 72, contact face 64, 74 and alignment pin passageways 67, 77 with tight-fit sections 66, 76 similarly to the ferrules described above. The alignment pin passageways 67, 77 can also have flex sections 68, 78 that can taper wider along the longitudinal axis Z between the tight-fit sections 66, 76 and the rear end 62, 72. In particular, FIG. 13 illustrates that the flex sections 68 can taper from a circular first diameter of the tight-fit sections 66 to a shape at the rear end 62 that includes a pair of opposing semi-circles separated by a pair of parallel top and bottom surfaces. The pair of opposing semi-circles can have the same diameter as the first diameter of the first transverse cross-sectional shapes in the tight-fit sections 66 and the pair of parallel top and bottom surfaces can be separated by a distance equal to the first diameter. Alternatively, FIG. 14 illustrates that the flex sections 78 can taper wider from a circular first diameter of the tight-fit sections 76 to a rectangular shape at the rear end 72.

Figure 15:
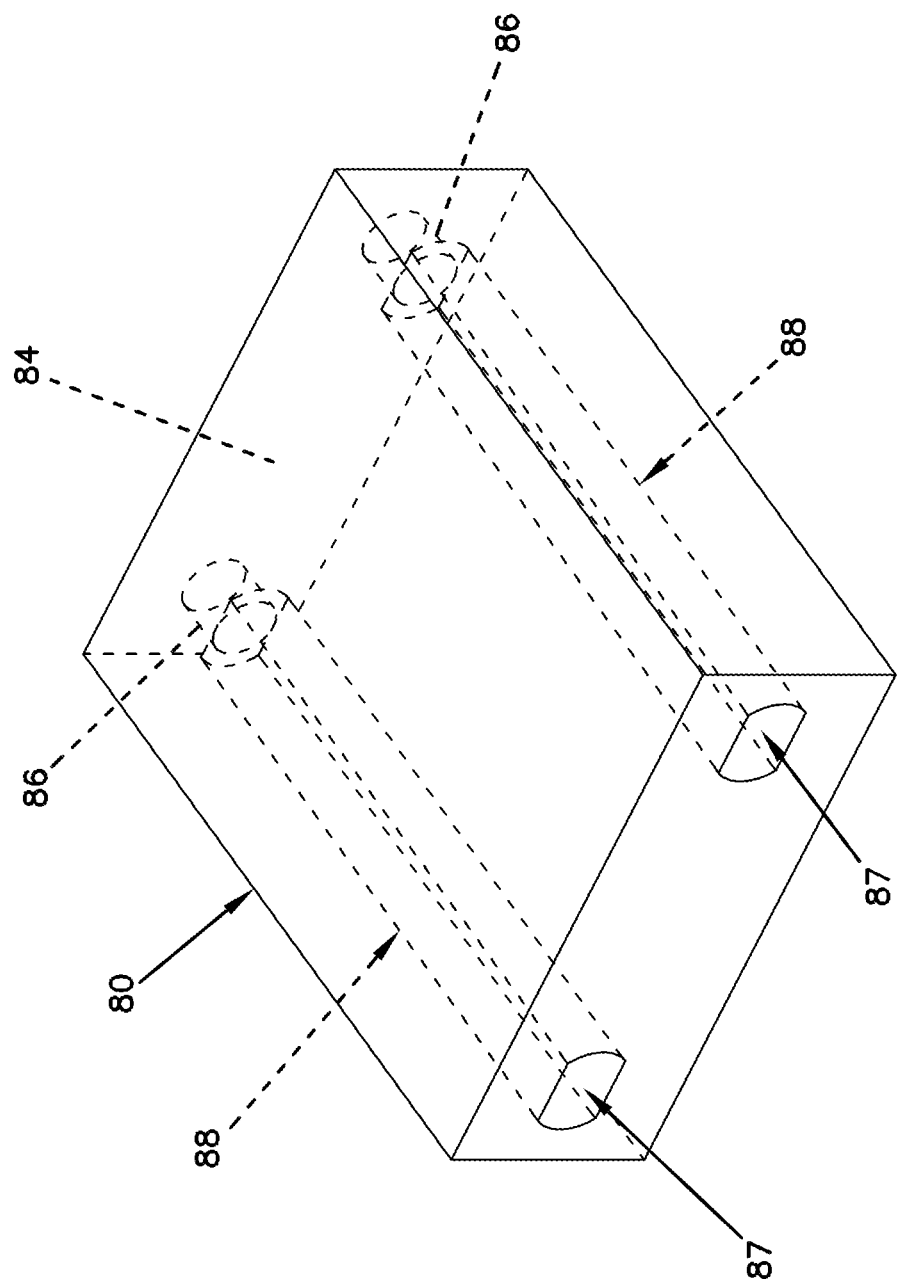
FIG. 15 shows a perspective rear-end see-through view of a multi-fiber ferrule according to a seventh example embodiment of the present disclosure.

As illustrated particularly in FIG. 15, an alternative ferrule body 80 can include a contact face 84 and alignment pin passageways 87 with tight-fit sections 86 similarly to the ferrules described above. The depicted ferrule body 80 can also have flex sections 88 defined by a transverse cross-sectional profile defined by a pair of opposing semi-circles separated by a pair of parallel top and bottom surfaces, similarly to the embodiment in FIG. 12. The pair of parallel top and bottom surfaces can be separated along the minor axis Y by a distance equal to the height of the transverse cross-sectional profile of the tight-fit section 80 along the minor axis Y. The transverse cross-sectional profile of the flex sections 88 has a clearance defined by a greater width along the major axis X than the tight-fit sections. The flex sections 88 maintain this transverse cross-sectional profile consistently throughout their length, similarly to the embodiment in FIG. 11.

PARTS LIST

3—Multi-fiber ferrule body
5—Tight-fit section of alignment pin passageway
7—Alignment pin
9—Loose-fit flex section of alignment pin passageway
10—Multifiber ferrule body
12—Ferrule body front end
14—Ferrule body rear end
16—Ferrule contact face
18—Alignment pin passageway
20—Optical fibers
22—Ferrule support surface
24—Alignment pin
25—Transition point between proximal end cross-sectional profile and distal tip end
26—Tight-fit section
28—Loose-fit flex section
30—Alternative ferrule body
32—loose-fit flex section
34—tight-fit section
36—recessed notch
40—front end
42—rear end
44—contact face
46—tight-fit section
47—alignment pin passageway
48—loose-fit flex section
50—front end
52—rear end
54—contact face
56—tight-fit section
57—alignment pin passageway
58—loose-fit flex section
60—front end
62—rear end
64—contact face
66—tight-fit section
67—alignment pin passageway
68—loose-fit flex section
70—front end
72—rear end
74—contact face
76—tight-fit section
77—alignment pin passageway
78—loose-fit flex section
80—front end
82—rear end
84—contact face
86—tight-fit section
87—alignment pin passageway
88—loose-fit flex section Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A fiber optic connector ferrule comprising:
    a ferrule body including a depth along a longitudinal axis that extends from a front end to a rear end of the ferrule, the ferrule including a contact face at the front end of the ferrule, the contact face including a major dimension that extends along a major axis and a minor dimension that extends along a minor axis, the major and minor axes being perpendicular to one another and perpendicular to the longitudinal axis, the ferrule also defining alignment pin receivers that extend rearwardly from the front end of the ferrule, the alignment pin receivers defining a tight-fit section defined by a first transverse cross-sectional profile extending into the ferrule body from the contact face and a loose-fit flex section defined by a second transverse cross-sectional profile extending from the first transverse cross-sectional profile to the rear end, the second transverse cross-sectional profile comprising a different clearance than the first transverse cross-sectional profile;

a plurality of optical fibers that extend through the ferrule body, the optical fibers having end faces accessible at the contact face of the ferrule; and a pair of alignment pins comprising proximal ends positioned within the alignment pin receivers and distal ends protruding outwardly away from the contact face, wherein end portions of the alignment pins and the loose-fit flex section are relatively configured to provide pivotability of the alignment pins relative to the ferrule body, wherein the different clearances of the first and second cross-sectional profiles define a degree of the pivotability between the alignment pins and the ferrule body, and wherein the ferrule further comprises at least one recessed region surrounding one of the alignment pin receivers and extending to edges of the ferrule body along the major axis and minor axis, the at least one recessed region being recessed from the contact face into the ferrule body.

2. The fiber optic connector ferrule of claim 1, wherein the proximal ends of the alignment pins engage the tight-fit sections of the alignment pin receivers.

3. The fiber optic connector ferrule of claim 1, wherein the tight-fit sections of the alignment pin receivers extend along the longitudinal axis a maximum of twice a transverse diameter of the alignment pins' proximal ends.

4. The fiber optic connector ferrule of claim 1, wherein the distal ends of the alignment pins protrude outwardly away from the contact face between about 0.2 mm and about 3.1 mm.

5. The fiber optic connector ferrule of claim 1, wherein the first transverse cross-sectional profiles are circular and comprise a first diameter.

6. The fiber optic connector ferrule of claim 5, wherein the first transverse cross-sectional profiles maintain the first diameter from the contact face to the second transverse cross-sectional profiles.

7. The fiber optic connector ferrule of claim 6, wherein the second transverse cross-sectional profiles are circular and comprise a second diameter that is greater than the first diameter.

8. The fiber optic connector ferrule of claim 7, wherein the alignment pin receivers maintain the second diameter between the first transverse cross-sectional profiles and the rear end.

9. The fiber optic connector ferrule of claim 6, wherein the second transverse cross-sectional profiles are rectangular having a greater width than the first diameter along the major axis.

10. The fiber optic connector ferrule of claim 9, wherein the alignment pin receivers maintain the rectangular shape between the first transverse cross-sectional profiles and the rear end.

11. The fiber optic connector ferrule of claim 6, wherein the second transverse cross-sectional profiles are oval having a greater width than the first diameter along the major axis.

12. The fiber optic connector ferrule of claim 11, wherein the alignment pin receivers maintain the oval shape between the first transverse cross-sectional profiles and the rear end.

13. The fiber optic connector ferrule of claim 6, wherein the second transverse cross-sectional profiles comprise a pair of opposing semi-circles separated by a pair of parallel top and bottom surfaces, wherein the pair of opposing semi-circles comprise the same diameter as the first diameter and the pair of parallel top and bottom surfaces are separated by a distance equal to the first diameter.

14. The fiber optic connector ferrule of claim 13, wherein the alignment pin receivers maintain the second diameter between the first transverse cross-sectional profiles and the rear end.

15. The fiber optic connector ferrule of claim 6, wherein the alignment pin receivers taper wider in the major axis dimension along the longitudinal axis between the first transverse cross-sectional profiles and the rear end.

16. The fiber optic connector ferrule of claim 15, wherein the alignment pin receivers taper from the circular first diameter to a rectangular shape at the rear end.

17. The fiber optic connector ferrule of claim 16, wherein the rectangular shape at the rear end comprises a height along the minor axis equal to the first diameter.

18. The fiber optic connector ferrule of claim 15, wherein the alignment pin receivers taper from the circular first diameter to a shape at the rear end that comprises a pair of opposing semi-circles separated by a pair of parallel top and bottom surfaces.

19. The fiber optic connector ferrule of claim 17, wherein the pair of opposing semi-circles comprise the same diameter as the first diameter and the pair of parallel top and bottom surfaces are separated by a distance equal to the first diameter.

20. The fiber optic connector ferrule of claim 1, wherein the at least one recessed region includes a pair of recessed regions surrounding the alignment pin receivers and extending to the edges of the ferrule body along the major axis and the minor axis, the recessed regions being recessed from the contact face into the ferrule body.

21. The fiber optic connector ferrule of claim 1, wherein the degree of the pivotability between the alignment pins and the ferrule body increases with an increased dimensional difference between the second transverse cross-sectional profile and cross-sectional profiles of the alignment pins, and vice versa.

22. The fiber optic connector ferrule of claim 1, wherein the degree of the pivotability between the alignment pins and the ferrule body decreases with an increase in the length of the tight-fit sections, and vice versa.

23. A fiber optic connector ferrule comprising:
a ferrule body including a depth along a longitudinal axis that extends from a front end to a rear end of the ferrule, the ferrule including a contact face at the front end of the ferrule, the contact face including a major dimension that extends along a major axis and a minor dimension that extends along a minor axis, the major and minor axes being perpendicular to one another and perpendicular to the longitudinal axis, the ferrule also defining alignment pin receivers that extend rearwardly from the front end of the ferrule, the alignment pin receivers defining a tight-fit section defined by a first transverse cross-sectional profile having a first shape and extending into the ferrule body from the contact face and a loose-fit flex section defined by a second transverse cross-sectional profile having a second shape and extending from the first transverse cross-sectional profile to the rear end, the second transverse cross-sectional profile comprising a different clearance than the first transverse cross-sectional profile, and the first and second shapes being different from each other;

a plurality of optical fibers that extend through the ferrule body, the optical fibers having end faces accessible at the contact face of the ferrule; and a pair of alignment pins comprising proximal ends positioned within the alignment pin receivers and distal ends protruding outwardly away from the contact face, wherein end portions of the alignment pins and the loose-fit flex section are relatively configured to provide pivotability of the alignment pins relative to the ferrule body, and wherein the different clearances of the first and second cross-sectional profiles define a degree of the pivotability between the alignment pins and the ferrule body.

24. The fiber optic connector ferrule of claim 23, wherein the second shape is a rectangle.

25. The fiber optic connector ferrule of claim 23, wherein the second shape is an oval.

26. The fiber optic connector ferrule of claim 23, wherein the second shape is defined by a pair of opposing semi-circles separated by a pair of parallel top and bottom surfaces.

\* \* \* \* \*